US011689572B2

(12) United States Patent
Buck

(10) Patent No.: US 11,689,572 B2
(45) Date of Patent: Jun. 27, 2023

(54) SYSTEMS AND METHODS FOR INVENTORY MANAGEMENT USING PRIME NUMBERS

(71) Applicant: Ent. Services Development Corporation LP, Houston, TX (US)

(72) Inventor: Keith Robert Buck, Bloomfield, IN (US)

(73) Assignee: Ent. Services Development Corporation LP, Houston, TX (US)

(*) Notice: Subject to any disclaimer, the term of this patent is extended or adjusted under 35 U.S.C. 154(b) by 370 days.

(21) Appl. No.: 16/716,163

(22) Filed: Dec. 16, 2019

(65) Prior Publication Data

US 2021/0152603 A1 May 20, 2021

Related U.S. Application Data

(63) Continuation of application No. 16/685,750, filed on Nov. 15, 2019.

(51) Int. Cl.
*H04L 9/40* (2022.01)

(52) U.S. Cl.
CPC .................... *H04L 63/20* (2013.01)

(58) Field of Classification Search
CPC ............. H04L 63/20; H04L 63/105
USPC ............................................ 726/1
See application file for complete search history.

(56) References Cited

U.S. PATENT DOCUMENTS

| 6,292,942 B1 | 9/2001 | Kennedy |
| 6,892,307 B1 | 5/2005 | Wood et al. |
| 7,131,143 B1 | 10/2006 | Lamacchia et al. |
| 10,114,864 B1* | 10/2018 | Torun ............... G06F 16/24542 |
| 2004/0034636 A1* | 2/2004 | Vallur ................. G06F 16/215 |
| 2006/0080171 A1* | 4/2006 | Jardins ............... G06Q 30/0272 705/28 |
| 2007/0112818 A1 | 5/2007 | Sastry |
| 2009/0222473 A1 | 9/2009 | Chowdhury |
| 2010/0212017 A1 | 8/2010 | Li et al. |

(Continued)

FOREIGN PATENT DOCUMENTS

EP 1225512 A1 7/2022

OTHER PUBLICATIONS

International Search Report dated Mar. 5, 2021 issued in corresponding Patent Application No. PCT/US2020/05839 (4 pages).

(Continued)

*Primary Examiner* — Kambiz Zand
*Assistant Examiner* — Aubrey H Wyszynski
(74) *Attorney, Agent, or Firm* — Polsinelli PC

(57) ABSTRACT

Various embodiments of the present technology can include systems, methods, and non-transitory computer readable media configured to receive information about a plurality of regions contained within a hierarchy of a computer network environment, wherein the plurality of regions are assigned respective prime numbers. A first prime number assigned to a first region of the plurality of regions is determined. A second prime number assigned to a second region of the plurality of regions, wherein the second prime number is different from the first prime number is determined. A nearest common region in the hierarchy that includes the first region and the second region based on the respective prime numbers is identified. A security policy associated with the nearest common region is determined.

20 Claims, 9 Drawing Sheets

(56) References Cited

U.S. PATENT DOCUMENTS

2013/0080494 A1* 3/2013 Murayama ............... G06F 7/38
708/517
2018/0255102 A1 9/2018 Ward et al.

OTHER PUBLICATIONS

Written Opinion dated Mar. 5, 2021 issued in corresponding Patent Application No. PCT/US2020/05839 (5 pages).
M. Poongodi et al., "A Novel Intrusion Detection System Based on Trust Evaluation to Defend Against DDoS Attack in Manet", In: Research Article—Computer Engineering and Computer Science, Sep. 24, 2015.

* cited by examiner

| r | rs | pr | f(rs) | f(r) = pr × f(rs) |
|---|----|----|----|----|
| A | - | 1 | 1 | 1 |
| B | A | 2 | 1 | 2 |
| C | A | 3 | 1 | 3 |
| D | B | 5 | 2 | 10 |
| E | B | 7 | 2 | 14 |

| r | $r_S, r_T$ | $p_r$ | $f(r_S), f(r_T)$ | $f(r) = p_r \times f(r_S) \times f(r_T)$ |
|---|---|---|---|---|
| A | - | 1 | 1 | 1 |
| B | A | 2 | 1 | 2 |
| C | A, T | 3 | 1, 11 | 33 |
| D | B, T | 5 | 2, 11 | 110 |
| E | B | 7 | 2 | 14 |
| T | A | 11 | 1 | 11 |

SYSTEMS AND METHODS FOR INVENTORY MANAGEMENT USING PRIME NUMBERS

CLAIM FOR PRIORITY

This application is a Continuation of U.S. application Ser. No. 16/685,750, filed on Nov. 15, 2019, and entitled "SYSTEMS AND METHODS FOR AUTOMATED DETERMINATION OF TRUST LEVELS ASSOCIATED WITH REGIONS AND SECURELY TRANSPORTING DATA BETWEEN THE REGIONS", which is incorporated herein by reference.

FIELD OF THE INVENTION

The present technology relates to the field of data security. More particularly, the present technology relates to determination of trust levels (e.g., security policies) associated with regions and securely transporting data between the regions according to the determined trust levels.

BACKGROUND

Today, rate of transporting data from one location to another location is increasing. When data is transported from one component to another, the data may be exposed to numerous threats and attacks. Various protection mechanisms address such security concerns. However, extreme security measures for data that is transported between relatively secure regions can be unduly burdensome. Conversely, lax security measures for data that is transported between unsecure regions do not adequately address security concerns. Accordingly, security measures should be commensurate with a level of protection demanded for a path connecting regions through which the data travels. Traditional methods rely on human security experts to manually determine the path, and define security measures associated with the path. For example, a security expert may refer to an architectural model of a data environment, identify a path connecting a source component and a destination component, and determine a corresponding security measure for the path. Such manual endeavors associated with security measures can be disadvantageous because they may involve efforts that are ad hoc, brute force, error prone, and inflexible as updates are made to the architectural model. These disadvantages can be exacerbated when the model is relatively complex.

SUMMARY

Various embodiments of the present disclosure can include systems, methods, and non-transitory computer readable media configured to receive information about a plurality of regions contained within a hierarchy of a computer network environments, wherein the plurality of regions are assigned respective prime numbers. A first prime number assigned to a first region of the plurality of regions is determined. A second prime number assigned to a second region of the plurality of regions, wherein the second prime number is different from the first prime number is determined. A nearest common region in the hierarchy that includes the first region and the second region based on the respective prime numbers is identified. A security policy associated with the nearest common region is determined.

In an embodiment, the plurality of regions are associated with respective trust levels. The determining a security policy further comprises: determining a first trust level associated with the nearest common region; and acquiring the security policy for the nearest common region based on the first trust level associated with the nearest common region.

In an embodiment, a parent region in the hierarchy having one or more child regions is associated with a corresponding trust level that is trusted equally or less than trust levels associated with the one or more child regions.

In an embodiment, the first trust level associated with the nearest common region is more trusted than a second trust level associated with a parent region of the first region, and the various embodiments are further configured to: calculate a first product of the first prime number, respective prime numbers associated with one or more parents of the first region, and respective prime numbers associated with one or more tunnels of the first region; calculate a second product of the second prime number, respective prime numbers associated with one or more parents of the second region and the third prime number, and respective prime numbers associated with one or more tunnels of the second region; determine that a third prime number associated with a tunnel evenly divides both the first product and the second product, wherein the even division indicates that the tunnel connects the first region and the second region; acquire a security measure assigned to the tunnel; apply the security measure to a packet of data to be transported via the tunnel; and transport the packet of data of data according to the security measure.

In an embodiment, a packet of data to be transported from the first region to the second region is acquired; a security measure to apply to the packet of data based on the security policy associated with the nearest common region is determined; the security measure is applied to the packet of data; and the packet of data is transported from the first region to the second region.

In an embodiment, the plurality of regions in the hierarchy are represented by respective unique prime numbers.

In an embodiment, the identifying the nearest common region in the hierarchy further comprises: calculating a first product of the first prime number and respective prime numbers associated with one or more parents of the first region; calculating a second product of the second prime number and respective prime numbers associated with one or more parents of the second region; calculating a greatest common denominator for the first product and the second product; and identifying a region represented by the greatest common denominator as the nearest common region.

In an embodiment, the identifying the region represented by the greatest common denominator further comprises: performing a reverse look up with the greatest common denominator to determine the region.

In an embodiment, security policies, including the security policy, are attributes associated with corresponding regions.

In an embodiment, an outermost region containing all other regions in the hierarchy is assigned a value of 1.

Various embodiments of the present disclosure can include systems, methods, and non-transitory computer readable media configured to associate item types in a catalogue of item types with respective unique prime numbers. Each item type is associated with a corresponding unique prime number. The catalogue is associated with an inventory of items. The inventory of items including one or more items of the item types in the catalogue is represented with a multiplicative product of the respective unique prime numbers.

In an embodiment, a listing of a plurality of items is received. The representing the inventory of items with the multiplicative product of the respective unique prime numbers further comprises: setting a running product to 1; and for each item in the listing of the plurality of items: determining the corresponding unique prime number associated with the item; and multiplying the running product with the corresponding unique prime number.

In an embodiment, an indication that an item of an item type is added to the inventory is received; and the multiplicative product is multiplied with a corresponding unique prime number associated with the item type of the added item.

In an embodiment, an indication that an item of an item type is removed from the inventory is received; and the multiplicative product is divided with a corresponding unique prime number associated with the item type of the removed item.

In an embodiment, it is determined that the inventory contains an item of an item type when the multiplicative product representing the inventory is evenly divisible by a corresponding unique prime number associated with the item type; or it is determined that the inventory does not contain the item of the item type when the multiplicative product representing the inventory is not evenly divisible by the corresponding unique prime number associated with the item type.

In an embodiment, an indication that an item type is added to the catalogue is received; and a unique prime number, different from the respective unique prime numbers, is assigned to the item type.

In an embodiment, an indication that an item type is removed from the catalogue is received; and a validation that the multiplicative product representing the inventory is not divisible by a corresponding unique prime number associated with the item type is performed.

In an embodiment, the corresponding unique prime number associated with the item type is released such that the corresponding unique prime number can later be associated with a different item type.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
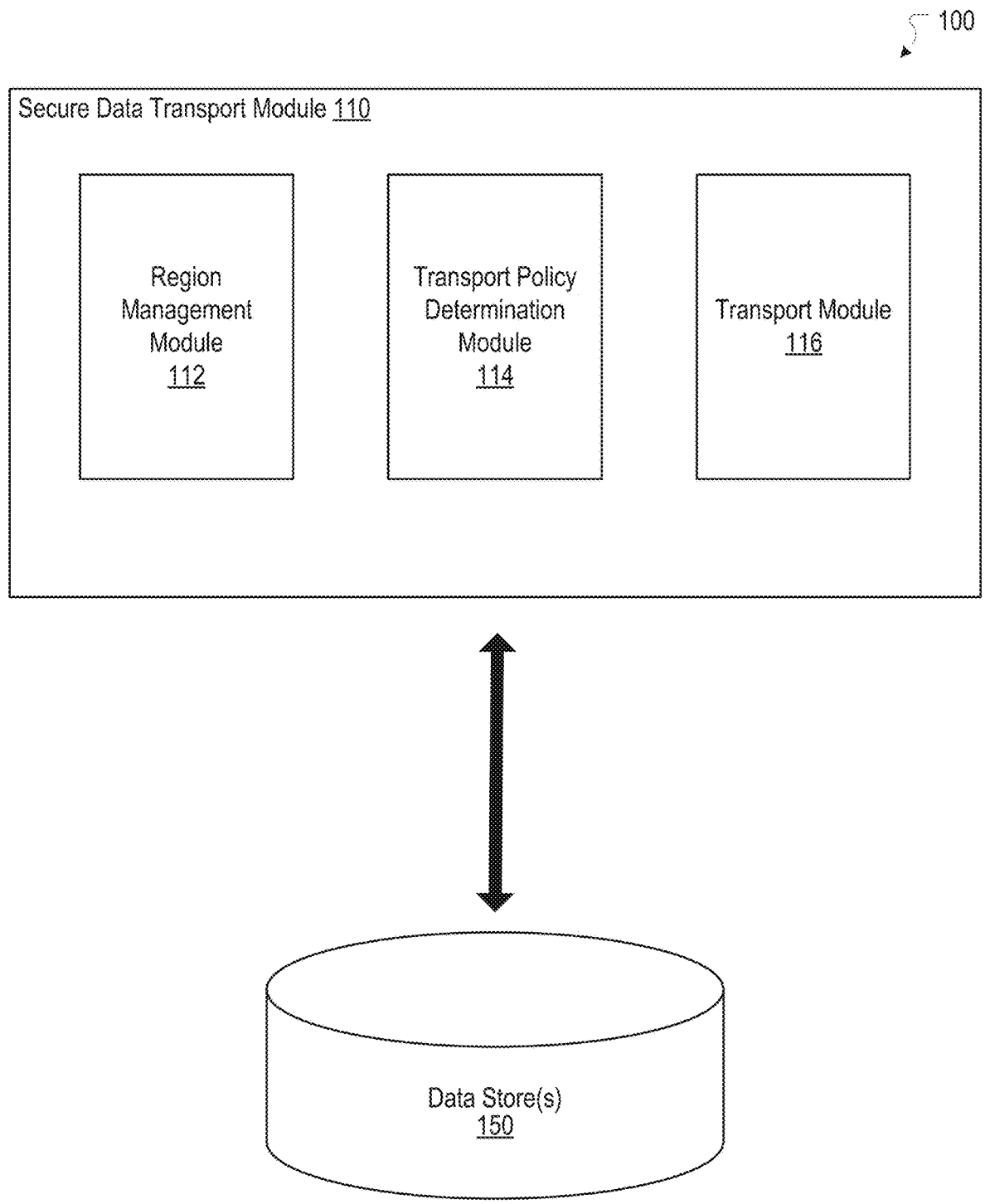
FIG. 1 illustrates an example system including a secure data transport module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Automated Determination of Common Regions in a Hierarchy and a Commensurate Security Policy Today, rate of transporting data from one location to another location is increasing. When data is transported from one component to another, the data may be exposed to numerous threats and attacks. Various protection mechanisms address such security concerns. However, extreme security measures for data that is transported between relatively secure regions can be burdensome. Conversely, lax security measures for data that is transported between unsecure regions do not adequately address security concerns. Accordingly, security measures should be commensurate with a level of protection demanded for a path connecting regions through which the data travels. Traditional methods rely on human security experts to manually determine the path, and define security measures associated with the path. For example, a security expert refers to an architectural model of a data environment, identify a path connecting a source component and a destination component, and determine a corresponding security measure for the path. Such manual endeavors associated with security measures can be disadvantageous because they may involve efforts that are ad hoc, brute force, error prone, and inflexible as updates are made to the architectural model. These disadvantages can be exacerbated when the model is relatively complex.

An improved approach rooted in computer technology overcomes the foregoing and other disadvantages associated with conventional approaches specifically arising in the realm of computer technology. Based on computer technology, the disclosed technology provides improved techniques of automatically identifying a nearest common region containing at least two regions in a hierarchy and determining a trust level (or a security policy) associated with the nearest common region. A security measure consistent with the determined trust level can then be determined and applied to a packet of data to be transported between (or among) the at least two regions. Each region may have an associated unique prime number. Further, each region may be represented by a product of the associated unique prime number and other unique prime numbers associated with its parent regions (e.g., super-regions). The nearest common region may be identified by calculating the greatest common denominator (GCD) of the respective products associated with the at least two regions. Once the nearest common region has been determined, a trust level associated with the nearest common region may be determined. By generating the identification of the nearest common region and determination of the trust level (or a security policy) associated with the nearest common region, the improved approach can advantageously automate determination and application of commensurate security measures for a path through which data is transported.

FIG. 1 illustrates an example system 100 including a secure data transport module 110, according to an embodiment of the present technology. The secure data transport module 110 can be configured to securely transport data, such as packets of data, with commensurate security measures. For example, the secure data transport module 110 can determine a source location of data to be transported and a destination location for the data, determine commensurate security measures to apply to the data based on a travel path from the source location to the destination location, and apply the commensurate security measures to the data before or during the transport of the data.

As shown in FIG. 1, the secure data transport module 110 can include a region management module 112, a transport policy determination module 114, and a transport module 116. It should be noted that the components (e.g., modules) shown in this figure and all figures herein are exemplary only, and other implementations may include additional, fewer, integrated or different components. Some components may not be shown so as not to obscure relevant details.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device or on a server. For example, one or more modules and/or applications described herein, or at least a portion thereof, can be implemented as or within an application (e.g., app), a program, or an applet, etc., running on a user computing device or a client computing system. In another example, one or more modules and/or applications, or at least a portion thereof, can be implemented using one or more computing devices or systems that include one or more servers, such as network servers or cloud servers. It should be understood that there can be many variations or other possibilities.

The region management module 112 can be configured to set up and manage regions to facilitate automatic determination of a nearest common region containing a data travel path. A region can be, for example, an area, division, or subdivision of a space. A space can be, for example, physical, logical, or virtual (e.g., a computer network environment). Each region may be associated with a variety of attributes including a trust level, security policies, confidentiality, availability, integrity, etc. As discussed in more detail herein, a region can be associated with a trust level or an attribute indicative of some degree of trust, which in turn can be associated with a security policy. In transport of data, the data can start at, a source location that can be a physical, logical, or virtual asset and can stop at a destination location that can be a different physical, logical, or virtual asset. For example, the source location of the data may be a workstation and the destination location of the data may be a mobile device. In another example, the source location of the data may be located on a container on a cloud environment hosting virtual operating systems and the destination location of the data may be a wearable device. Assets at a location that share same or similar security concerns can be grouped into a region, thus associating the assets with the attributes of the region. The region management module 112 can generate identifiers for the regions. Using the generated identifiers, the region management module 112 can manage relationships between (or among) the regions.

The transport policy determination module 114 can be configured to determine a security policy appropriate for transporting data from a source location to a destination location. Based on the region relationships maintained by the region management module 112, the transport policy determination module 114 can identify a nearest common region the data must traverse when traveling from a source location to a destination location. The transport policy determination module 114 can determine a security policy associated with the nearest common region. Generally, a region and assets associated with the region can be associated with a trust level (or an attribute indicative of some degree of trust), which in turn can be associated with a security policy. For example, all of the assets within a particular region may be associated with a trust level, which in turn is associated with a security policy that specifies that any data transported through the particular region must be encrypted and be consistent with the secure HTTP protocol.

The transport module 116 can be configured to transport data from a source location to a destination location. The transport module 116 can apply one or more security measures that are consistent with a determined security policy to the data before or during the transport. In some embodiments, the transport module 116 can apply one or more security measures that are consistent with a trust level determined for a nearest common region to the data before or during the transport.

As shown in FIG. 1, the secure data transport module 110 can be configured to communicate with a data store 150. The data store 150 can be configured to store and maintain various types of data to support the functionality of the secure data transport module 110. For example, the data store 150 can store region identifiers, region relationship data, region attributes (e.g., trust levels, security policies, confidentiality, etc.), security measures, hierarchical relationships and representations thereof, associations between regions and trust levels, associations between attributes and security policies, and other information required by the secure data transport module 110.

Figure 2A:
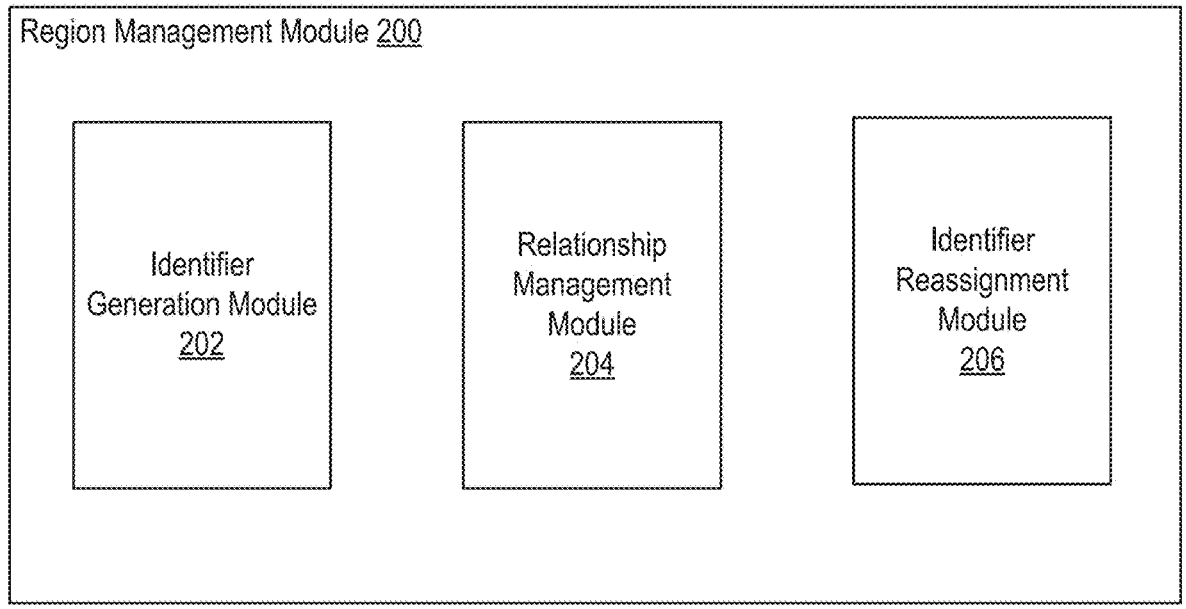
FIG. 2A illustrates an example region management module, according to an embodiment of the present technology.

FIG. 2A illustrates an example region management module 200 according to an embodiment of the present technology. In some embodiments, the region management module 112 of FIG. 1 can be implemented as the region management module 200. As shown in the example of FIG. 2, the region management module 200 can include an identifier generation module 202, a relationship management module 204, and an identifier reassignment module 206.

The identifier generation module 202 can be configured to generate identifiers for respective regions and associate the identifiers with the respective regions. The identifier generation module 202 can be configured to generate prime numbers and associate each of the prime numbers with a region. In an embodiment, a region can be associated with an identifier that is a unique prime number such that no two regions have identifiers that are the same prime number. In some embodiments, unique prime numbers can be successively generated and assigned as identifiers to regions, for example, starting with a prime number with a lowest value (e.g., 2), to a prime number to a next higher value (e.g., 3), to a prime number having a next higher value (5), to a prime number having a next higher value (e.g., 7), and so on. The identifier generation module 202 may keep track of an identifier that is the highest prime number generated and associated with a region. For a new region (an additional region) that is not yet associated with an identifier, the identifier generation module 202 may generate an identifier that is a current highest prime number after the previous highest prime number and associate the current highest prime number with the new region. In some embodiments, a top most region (e.g., outermost region) that does not have a parent region can be assigned an identifier of 1. All other regions that are contained within the top most region can be assigned an identifier that is a unique prime number. As will be described more in detail in relation to FIGS. 4A-4B, using smaller prime numbers may be advantageous in that they are more efficient in the usage of computer memory and, in some instances, more efficient in usage of computational (processing) operations. However, in some embodiments, any unique prime number may be used as an identifier for a region.

The relationship management module 204 can be configured to manage relationships among regions in a hierarchy. The regions may have hierarchical relationships reflecting parent regions and child regions. For example, a workstation can be located in an engineering department local area network (LAN) (e.g., a region), which is located in a company intranet (e.g., a super-region), which is located in the internet (e.g., a super-super-region). The internet super-super-region may also include a human resources department LAN which is outside the engineering department LAN region. The company intranet and the human resources department LAN are child regions (e.g., sub-regions) of the internet super-super-region. The engineering department LAN is a child region of the company intranet. A more detailed illustration of hierarchical regions is provided below with respect to FIG. 3A. In some embodiments, the relationship management module 204 represents hierarchical relationships of the regions based on unique prime numbers associated with the regions. For example, the relationship management module 204 can represent a hierarchical relationship associated with a region by a product of a prime number associated with the region and respective prime numbers associated with parent regions of the region. For instance, if a region associated with a prime number of 13 is a child region of three regions associated with 2, 5, and 11, then the hierarchical relationship for the region can be represented by a product of 1,430 (=2×5×11×13). A more detailed description of numerically representing hierarchical relationships is provided below with respect to FIG. 3B. The relationship management module 204 may update its representation of hierarchical relationships to reflect an addition or a removal of a region from a hierarchy.

The identifier reassignment module 206 can be configured to reassign region identifiers. For example, when a region is removed or two regions are merged to form one region, an identifier associated with the now non-existent region may be freed (or become available). In such instances, the identifier reassignment module 206 may reassign one or more region identifiers. In some embodiments, the identifier reassignment module 206 may determine that relevant regions (e.g., regions associated with frequent determinations) are associated with identifiers that cause storage and computational inefficiency because the identifiers are associated with large prime numbers. As a result, the identifier reassignment module 206 may reassign identifiers that are more efficient, such as smaller prime numbers, to the relevant regions.

Figure 2B:
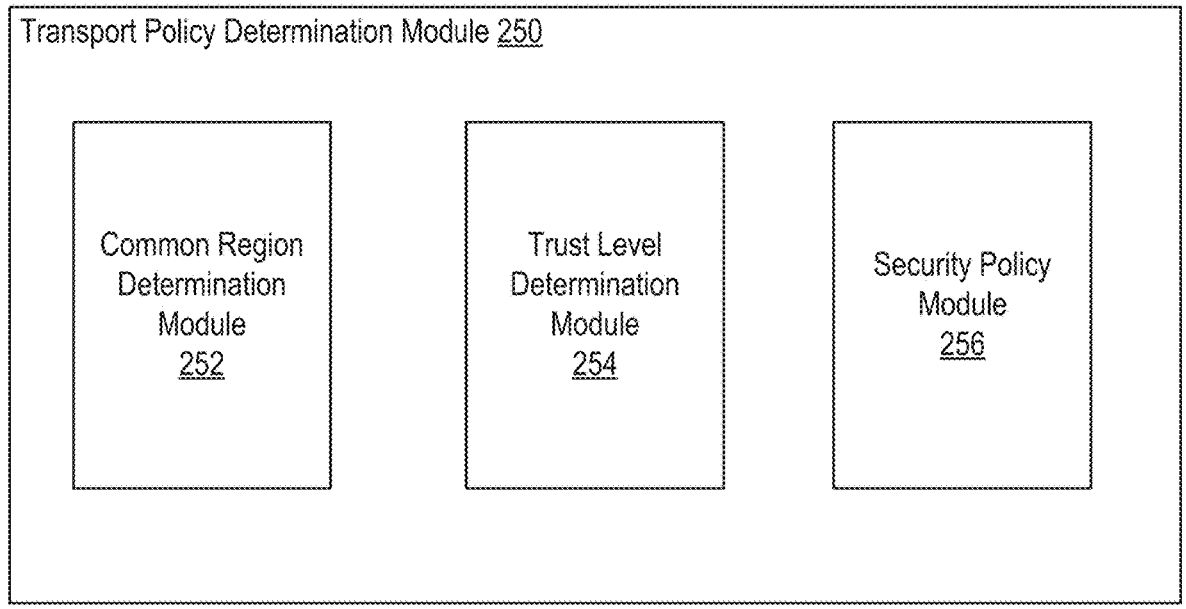
FIG. 2B illustrates an example transport policy determination module, according to an embodiment of the present technology.

FIG. 2B illustrates an example transport policy determination module 250 according to an embodiment of the present technology. In some embodiments, the transport policy determination module 114 of FIG. 1 can be implemented as the transport policy determination module 250. As shown in FIG. 2B, the transport policy determination module 250 can include a common region determination module 252, a trust level determination module 254, and a security policy module 256.

The common region determination module 252 can be configured to determine a nearest common region containing a first region and a second region. In context of data transport, a source location can be contained within the first region and a destination location can be contained within the second region. In some instances, a parent region may contain both the first region and the second region which are mutually exclusive (e.g., do not overlap), and the nearest common region for the first region and the second region can be the parent region. In other instances, the first region may be a parent region to the second region, and thus the nearest common region between the two regions can be the first region.

The nearest common region can be determined based on hierarchical relationships associated with respective regions. In some embodiments, the nearest common region can be determined by finding a greatest common denominator (GCD) of products of the prime numbers associated with a first region and a second region. In some embodiments, the GCD may be determined using the Euclidean algorithm or other suitable GCD algorithms. For example, as discussed above, the relationship management module 204 can represent a hierarchical relationship of a region with a product of a prime number associated with the region and prime numbers associated with parent regions of the region. Accordingly, the first region can be associated with a first product of prime numbers and the second region can be associated with a second product of prime numbers. As just one example, assume a first product is 1,430 (=2×5×11×13) for a first region associated with an identifier that is prime number 13. In this example, further assume a second product is 70 (=2×5×7) for the second region associated with an identifier that is prime number 7. GCD for the products is 10 (=2×5), which indicates that the first region and the second regions have a nearest common region associated with 10. In some embodiments, a reverse mapping can be applied to the GCD to determine a region corresponding to the GCD. In this example, a region that maps to 10 in a reverse map is the nearest common region for the first region and the second region. A more detailed description of determining the nearest common region can be found with respect to FIG. 3B.

The trust level determination module 254 can be configured to determine a trust level associated with a region. In some embodiments, the trust level determination module 254 can receive an input of one or more regions, and output respective trust levels for the regions. The region may be the nearest common region determined by the common region determination module 252. The trust level can be one of a plurality of trust levels indicating varying degrees of trust placed. For example, a first trust level can indicate that a relatively higher degree of trust is associated with a first region, a second trust level can indicate that a relatively lower degree of trust is associated with a second region, and a third trust level can indicate that a relatively yet lower degree of trust is associated with a third region. The trust level determination module 254 can determine a trust level associated with the nearest common region. In some embodiments, the trust level determination module 254 may determine various attributes that individually or collectively correspond to a degree of trust associated with a region. A trust level can be one such attribute. In some embodiments, lower degrees of trust (e.g., lower trust level) are often associated with parent regions (e.g., super-regions) than child regions (e.g., sub-regions) of the respective parent regions. However, as will be described in detail with respect to FIGS. 4A and 4B, in some embodiments, parent regions can be associated with higher degrees of trust than their child regions.

The security policy module 256 can be configured to determine security policies that are consistent with a trust level determined by the trust level determination module 254. In some embodiments, the security policy module 256 can receive an input of one or more attributes, and output respective security policies for the regions. A trust level can be one such attribute. For example, if a trust level indicates a lower degree of trust associated with a region, the security policy module 256 can determine a stricter security policy for use. If a trust level indicates a higher degree of trust associated with a region, the security policy module 256 can determine a less strict security policy for use. Accordingly, the security policy module 256 can determine a security policy that is commensurate with security required of a subject region. The security policy can be, in turn, associated with one or more security measures that can be implemented in applications of the present technology. Some security measures can include, for example, an encryption algorithm to be used with relative associated strengths (e.g., AES128, AES192, AES256, PGP, etc.), a transport layer protocol (e.g., TCP vs. UDP), an application layer protocol (e.g., HTTPS, TLS/SSL, etc.), a domain specific measure, etc.

Figures 3A, 3B:
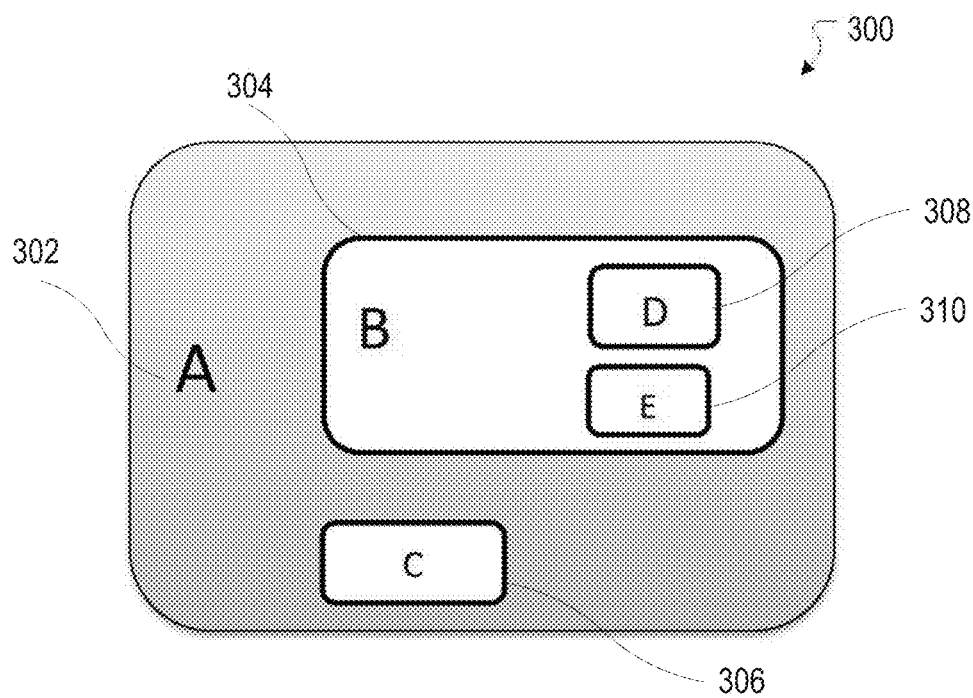
FIG. 3A-3B illustrates an example scenario associated with identifying a nearest common region in a hierarchy, according to an embodiment of the present technology.

FIG. 3A illustrates an example scenario 300 associated with identifying a nearest common region that contains two regions in a hierarchy, according to an embodiment of the present technology. As discussed above, a region can be determined as an area, division, or subdivision of a space, either physical, logical, or virtual. The region may contain child regions (sub-regions) and may be contained by a parent region (a super-region), thus forming a hierarchy of regions. Further, each region may be associated with a variety of attributes including, trust level, security policies, confidentiality, availability, integrity, etc. As shown in FIG. 3A, a top most (e.g., an outermost) region A 302 contains child regions B 304 and C 306. The child region B 304 further contains its child regions D 308 and E 310. The top most region A 302 contains the child regions D 308 and E 310. The region C 306 contains no child regions. It should be noted that while FIG. 3A uses a scale in which parent regions are larger than respective child regions, the regions are not necessarily physical and, thus, not associated with proportional sizes. Accordingly, while a region may be described as being larger or smaller than another region for ease of description, the regions are better described as having a parent-child (or super-sub) relationships.

In the example scenario 300, assume that the region D 308 and the region E 310 are an engineering department LAN region 308 and a human resources department LAN region 310, respectively, within a first company intranet region B 304. Further, assume that the region C 306 is a second company intranet region C 306. Lastly, assume that region A 302 is the Internet region which connects both the company intranet region B 304 and the second company intranet region C 306. The relationships among the regions are represented in FIG. 3B.

FIG. 3B illustrates an example table 350 associated with determining a nearest common region, according to an embodiment of the present technology. The example table 350 provides columns 352, 354, 356, 358, 360 and rows 362, 364, 366, 368, 370. The rows and columns are for illustrative purpose only and other forms of managing regions with fewer or additional elements are within scope of this disclosure. In relation to the example scenario 300, the first column r 352 lists regions A, B, C, D, and E, which correspond to regions A 302, B 304, C, 306, D 308, and E 310 in FIG. 3A.

The second column $r_s$ 354 lists a corresponding nearest parent region (e.g., a nearest super-region) which contain the region r of the first column 352 (i.e., r is an immediate sub-region of $r_s$). For example, since the region A 302 is the top most region, the first row 362 at second column $r_s$ 354 indicates that the region A 302 does not have a parent region. As another example, the second row 364 provides that the region A 302 is a parent region of the region B 304, and the region B 304 is a sub-region of the region A 302. As other examples, as the fourth and fifth rows 368, 370 indicate, the region B 304 is a parent region of the regions D 308 and E 310. The example table 350 can be a lookup table which maps r→$r_s$ for all regions r.

The third column $p_r$ 356 lists prime numbers. The prime numbers may be unique prime numbers. In some embodiments, the top most region A 362 is assigned a non-prime number 1. Other regions can be associated with unique prime numbers as indicated by rows 364, 366, 368, 370 assigning, for example, prime numbers 2, 3, 5, and 7 to, respectively, regions B 304, C 306, D 308, and E 310.

The fourth column $f(r_s)$ 358 lists products of all prime numbers associated with all of the parent regions in which each particular region r is contained. In some embodiments, the top most region containing all other sub-regions, such as the region A 302, can be defined to have $f(r_s)=1$. Other regions are associated with products of all prime numbers associated with all of their parent regions. For example, $f(r_s)$ for region B 304 is, as indicated by second row 364, 1 since it only has one parent region A 302 associated with 1. For region D 308, which has two parent regions of region B 304 and region A 302, $f(r_s)$ is, as indicated by fourth row 368, is 2 since it has two parent regions (1 for the region A 302 multiplied by 2 for the region B 304). Region E 310 similarly has two parent regions of region B 304 and region A 302 and thus, as indicated by fifth row 370, has $f(r_s)$ of 2 (1 for the region A 302 multiplied by 2 for the region B 304).

The fifth column $f(r)=p_r \times f(r_s)$ 360 lists products of $p_r$ of the third column 356 and $f(r_s)$ of the fourth column 358. For example, the region D 308 has f(r) of 10, as indicated by fourth row 368 since the $p_r$ for the region D 308, 5, is multiplied by the product of all prime numbers associated with its parent regions (i.e., region A 302 having prof 1 and region B 304 having prof 2). As another example, the region E 310 has f(r) of 14, as indicated by fifth row 370 since the $p_r$ for the region E 310, 7, is multiplied by the product of all prime numbers associated with its parent regions (i.e., region A 302 having prof 1 and region B 304 having prof 2). Thus, the values in the fifth column 360 can represent hierarchical relationships for each of the regions. The values in the fifth column 360 can be input to any GCD algorithm to determine a GCD that can identify a nearest common region.

A reverse mapping function f'(m) may be provided that identifies an associated region r for a given product m such that f(r)=m. In some embodiments, the reverse mapping function f'(m) is a look up function. The look up function may utilize a look up table. Given the reverse mapping function, a function $$f'(GCD(f(C),f(D)))$$

can be used to determine a nearest common region between any two regions. Continuing with the example in FIGS. 3A-3B, assume that data is to be transported between the regions C 306 and D 308. We can use the function to identify a nearest common region between the regions, for example:

$$f'(GCD(f(C),f(D)))=f'(GCD(3,10)=f'(1)=A.$$

Thus, the regions C 306 and D 308 have the nearest common region A 302. As another example, assume that data is to be transported between the regions D 308 and E 310. We can similarly use the function to identify the nearest common region between the regions, for example:

$$f'(GCD(f(D),f(E))=f'(GCD(10,14)=f'(2)=B.$$

Thus, the regions D 308 and E 310 have the nearest common region B 304. Once the nearest common region is determined, any number of attributes (including a trust level) associated with the nearest common region can be used for further analysis and/or determination of commensurate security measures for data transport. The foregoing is an example scenario and many other scenarios are possible. Further, the present technology can be expanded to apply to more than two regions (e.g., three regions, 14 regions, etc.) and to identify a nearest common region for the regions.

The hierarchical representations of regions using prime numbers provide many advantages over conventional methods. In contrast with conventional methods which require human security experts to analyze architectural diagrams to determine commensurate security measures for data transport, the present technology allows automatic and efficient determination of nearest common regions. By assigning security policies to the regions (or attributes of the regions), commensurate security measures can be determined with little to no human intervention. Further, aside from determining nearest common regions, the present technology enables convenient and efficient determination of whether any two regions have a parent-child relationship. If respective values f(r) in the fifth column 360 associated with two regions are wholly divisible (i.e., do not leave a remainder), then the regions have a parent-child relationship. If respective values of f(r) associated with the two regions are not wholly divisible (i.e., do leave a remainder), then the regions do not have a parent-child relationship. For example, the region C 306 is not contained within the region B 304 because respective values of f(r) for the two regions, 3 and 2, do not wholly divide (i.e., 3 divided by 2 leaves a remainder of 1). Likewise, the region B 304 is not contained within the region C 306 because the respective values of f(r) for the two regions, 2 and 3, do not wholly divide (i.e., 2 divided by 3 leaves a remainder of 2). The region E 310 is contained within the region B 304 because respective values of f(r) for the two regions, 14 and 2, wholly divide. All regions apart from region A 362 are contained within region A 362, the top most region (e.g., outermost region), because all respective values of f(r) associated with the regions are divisible by 1, the value of f(r) for region A 362.

The present techniques can easily scale up to larger and more complex architectural models. For deep hierarchies, prime numbers may be reassigned for efficiency and to avoid computational limits. Further, the present techniques may also take into account multiple attributes of a region, including standard security policies such as confidentiality, availability, integrity, non-security policies, etc. Taking into account multiple attributes of a region may be achieved by applying the techniques of the present technology on each attribute in parallel.

Figures 4A, 4B:
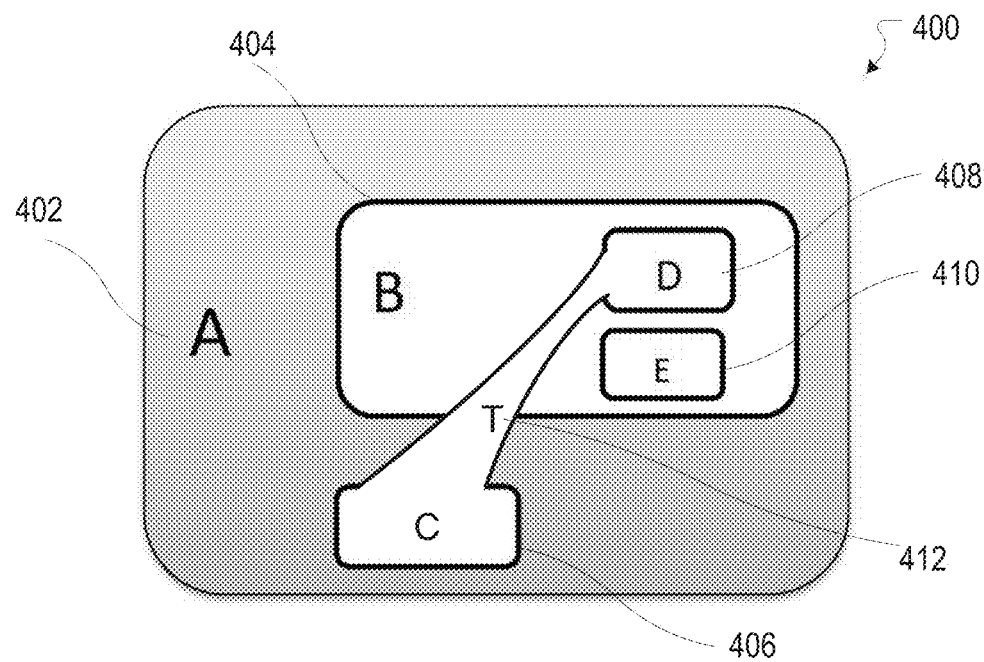
FIG. 4A-4B illustrates an example scenario associated with determining a tunnel connecting two regions that bypasses hierarchical relationships, according to an embodiment of the present technology.

FIG. 4A illustrates an example scenario 400 associated with determining a tunnel connecting two regions that bypasses hierarchical relationships, according to an embodiment of the present technology. FIG. 4A illustrates a set of regions organized in a hierarchy similar to the set of regions illustrated in FIG. 3A. However, in FIG. 4A, unlike a hierarchy in FIG. 3A where child regions are associated with higher degrees of trust than their parent regions, the hierarchy in FIG. 4A illustrates a scenario where at least one child region is associated with a lower degree of trust than one of its parent regions. For example, assume that a child region B 404 is less trusted than its parent region A 402. Such situations can arise when the child region B 404 poses special risk, such as when the region B 404 is used for computer virus research or as a honeypot. The child region B 404 has its own child regions D 408 and E 410. Assume data is to be transported between regions C 406 and D 408.

A nearest common region for the regions C 406 and D 408 is the region A 402. However, since the child region B 404 has a lower trust level than the parent region A 402, applying to region B 404 security measures commensurate with a trust level for the region A 402 would not sufficiently prevent attacks at or from the region B 404, which the data must traverse when travelling between the regions C 406 and D 408. In one embodiment of this invention which uses the trust level of destination to also determine appropriate security measures, such situations can be addressed by temporarily lowering a degree of trust associated with the region D 408 to or below that of the region C 406, and determining appropriate security measures based on the destination rather than the intervening transport regions. The trust level may be determined based on a transport (e.g., a channel connecting a source location and a destination location), a trust level associated with data received, and/or a trust level associated with a source location or a destination location. Alternatively, this can be addressed providing a tunnel 412 that connects the regions C 406 and D 408. The tunnel 412 may be analogized to a virtual private network (VPN). More details in relation to the tunnel T 412 are provided below.

FIG. 4B illustrates an example table 450 associated with determining a tunnel connecting two regions that bypasses hierarchical relationships, according to an embodiment of the present technology. The example table 450 provides columns 452, 454, 456, 458, 460 and rows 462, 464, 466, 468, 470, 472. The sixth row 472 adds the tunnel T 412 as an additional region T. In some embodiments, tunnels are assigned unique prime numbers such that, after GCD computation, the tunnels can be identified with by their respective assigned unique prime numbers. Further, in some embodiments, as the tunnels directly connect two regions and bypass some part of the parent-child hierarchical relationships, some tunnels can be considered as immediate children regions of the top most region such that they only answer to the top most region. Here, the region T 412 is associated with the top most parent region A 402 as indicated by the sixth row 472. At the sixth row 472, the region T 412 is further associated with a unique prime number $p_r$ having value of 11, a product of prime numbers associated with its parent sets $f(r_s)$ of 1 (since its parent is the region A 402), and a $f(r)=p_r \times f(r_s)$ of 11, as indicated by the last row 472 and the columns 452, 454, 456, 458, 460. The regions C 406 and D 408 associated with (e.g., connected to) the tunnel T 412 can be represented as having an additional parent region of the tunnel T 412, as indicated by the columns 454 and 458. The last column 460 can be updated to further multiply a product of the prime numbers associated with the tunnels (i.e. $f(r_T)$) of a region to products of $p_r$ and $f(r_s)$, according to $f(r)=p_r \times f(r_s) \times f(r_T)$. Using similar techniques presented with respect to FIGS. 3A-3B, the present techniques can be expanded to identify tunnels that bypass one or more parent regions and connect a child region with another region. For example:

$$f(GCD(f(C), f(D))) = f(GCD(33,110)) = f(11) = T.$$

Thus, the tunnel T 412 can be identified as a nearest common region between the regions C 406 and D 408. In some embodiments, the tunnel T 412 can be associated with a trust level that matches that of the region B 404. Since the tunnel T 412 is identified as the nearest common region instead of the region A 402, commensurate level of security measures may be applied to the data transported between the regions C 406 and D 408. The present technology can be expanded to apply to tunnels connecting more than two regions (e.g., three regions, 14 regions, etc.) and to identify a common tunnel for the regions.

Figure 5:
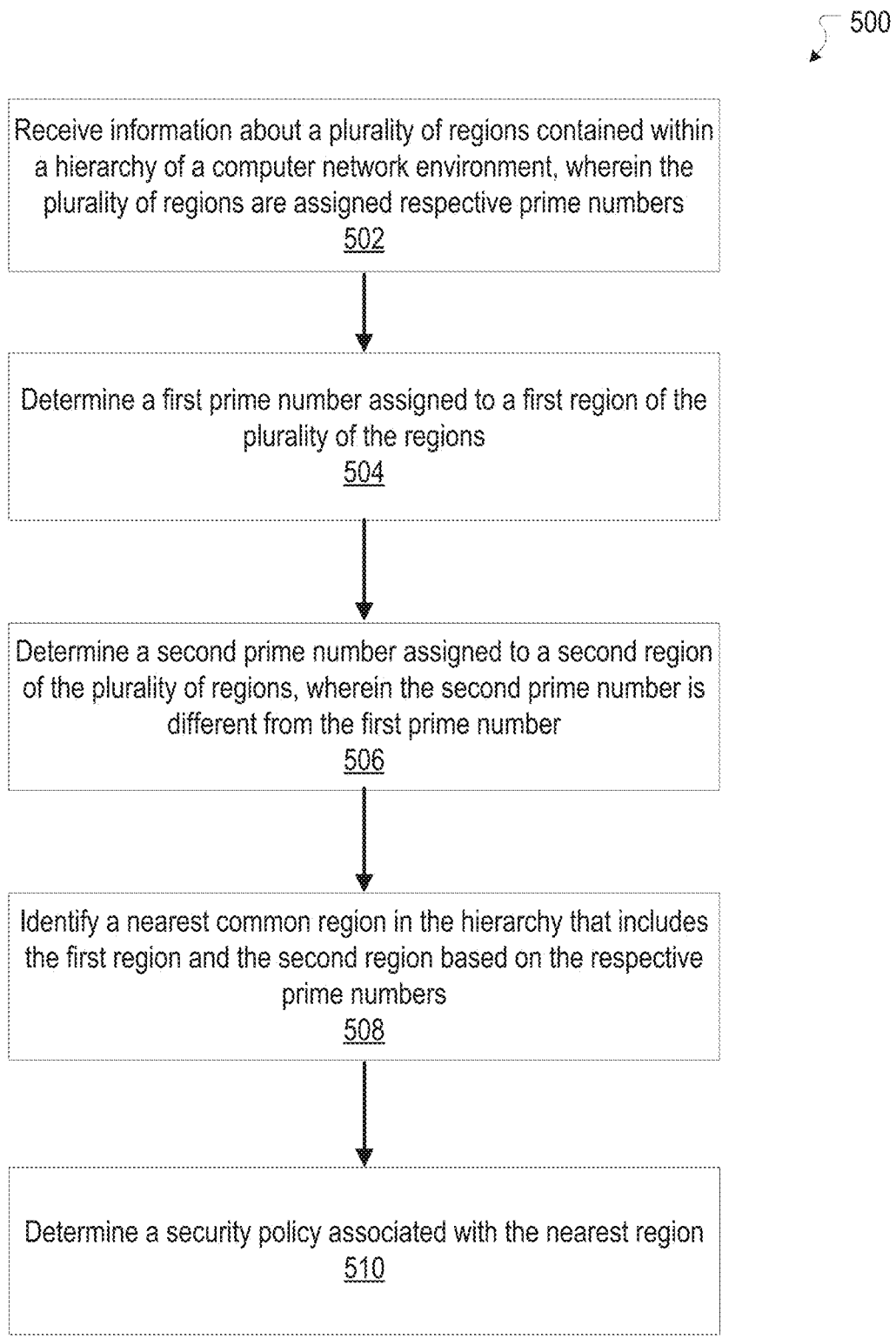
FIG. 5 illustrates a flowchart of an example method associated with determining a security policy for transporting data from a first region to a second region through a nearest common region, according to an embodiment of the present technology.

FIG. 5 illustrates a flowchart of an example method 500 associated with determining a security policy for transporting data from a first region to a second region through a nearest common region, according to an embodiment of the present technology. In some embodiments, It should be understood that there can be additional, fewer, or alternative steps performed in similar or alternative orders, or in parallel, based on the various features and embodiments discussed herein unless otherwise stated.

As shown in FIG. 5, at block 502, the example method 500 can receive information about a plurality of regions contained within a hierarchy, wherein the plurality of regions are assigned respective prime numbers. At block 504, the example method 500 can determine a first prime number assigned to a first region of the plurality of regions. At block 506, the example method 500 can determine a second prime number assigned to a second region of the plurality of regions, wherein the second prime number is different from the first prime number. At block 508, the example method 500 can identify a nearest common region in the hierarchy that includes the first region and the second region based on the respective prime numbers. At block 510, the example method 500 can determine a security policy associated with the nearest common region.

Figure 6:
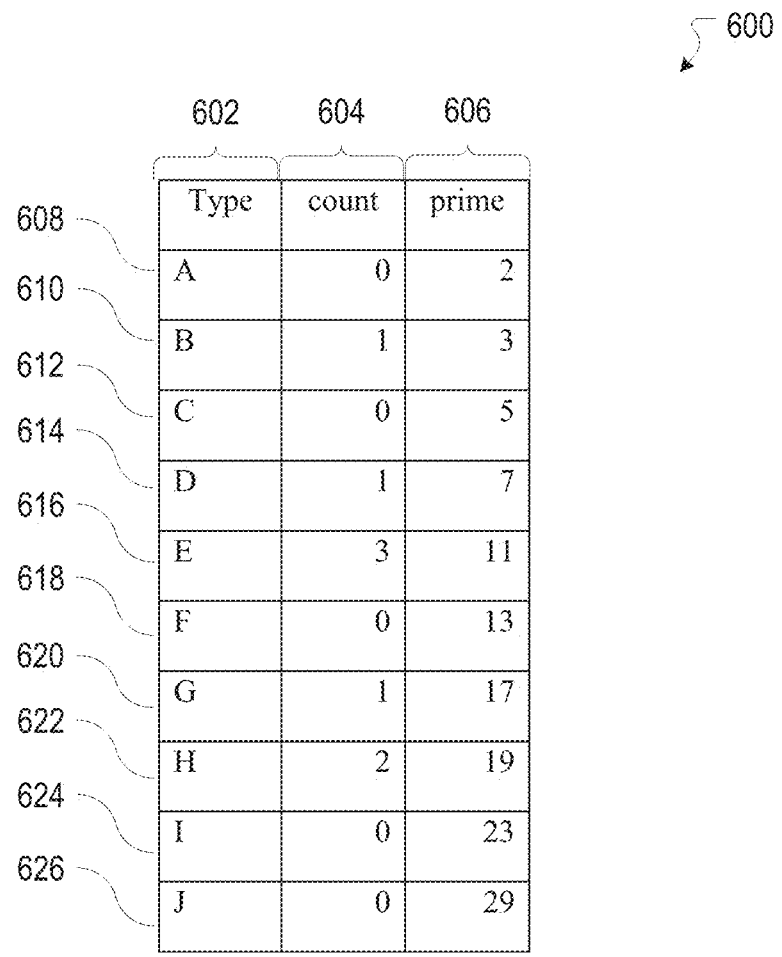
FIG. 6 illustrates an example table associated with representing an inventory of various types of objects with a multiplicative product, according to an embodiment of the present technology.

The present technology selectively utilizes prime numbers in other types of applications. As one example, the present technology can innovatively generate representations of inventories of objects based on prime numbers associated with the objects. FIG. 6 illustrates an example table 600 associated with representing an inventory of various types of objects with a multiplicative product (a product of numbers), according to an embodiment of the present technology. Assume a catalogue of items includes items A, B, C, D, E, F, G, H, I, and J, each associated with a different item type. The item types can each be represented with a unique prime number. Further, an inventory of the items in the catalogue can be represented with a multiplicative product of the unique prime numbers. The multiplicative product can represent an inventory of a plurality of an item type with a power (e.g., exponential) of the unique prime number associated with the item type. For example, the item types in the catalogue are listed in a type column 602. A third column 606 lists unique prime numbers corresponding to each item type. In some embodiments, the first column 602 and the third column 606 can be implemented as a look up table. A second column 604 lists a respective count of each item. In the example table 600, the inventory has no item A 608, one item B 610, no item C 612, one item D 614, three item Es 616, no item F 618, one item G 620, two item Hs 622, no item I 624, and no item J 626. The items are represented by unique prime numbers 2, 3, 5, 7, 11, 13, 17, 19, 23, and 29, respectively.

As described, a product of the unique prime numbers associated with all the objects may represent an inventory in the form of a single multiplicative product. The multiplicative product can be an integer and be represented as, for example, an instance of Java or C# programming language BigInteger class. In some embodiments, starting inventory can be assigned (e.g., defaulted to) 1, representing a running product of an empty inventory. Then, as an item gets added to the inventory, the associated unique number is multiplied to the running product. As an item gets removed from the inventory, the associated unique number is divided from the running product. The running product representative of the inventory can be calculated as:

$$\text{Running\_product} = \Pi_{m=A}^{J}(PN_{lookup}(m))^{count(m)},$$

where $PN_{lookup}(m)$ is an item type-to-prime number lookup function that takes in an item type m of the first column 602 and returns a corresponding unique prime number for the item type, and count(m) is a function that takes in the item type m and returns number of the item type m in the inventory.

The inventory in FIG. 6 has a running product 628 of $2^0 \times 3^1 \times 5^0 \times 7^1 \times 11^3 \times 13^0 \times 17^1 \times 19^2 \times 23^0 \times 29^0 = 171,535,287$. Conveniently, the running product 628 can represent the entire inventory of items of each item type. From the running product 628, it can be determined how many of each item type the inventory contains simply by checking whether the running product 628 is divisible with a unique prime number associated with an item type of interest and checking whether the division was even (i.e., no remainder was left). For example, it can be determined that the inventory does not contain an item A 608 by checking whether the running product 628 divides evenly with 2. The running product 628 of 171,535,287 is not evenly divisible by 2 (i.e., leaves a remainder of 1), thus the inventory does not contain an item A 608. On the other hand, dividing the running product 628 with a unique prime number associated with an item E 616 results in an even division, as 11 evenly divides into (e.g., no remainder is left) 171,535,287 to yield a first temporary result 15,597,117. The running product 628 can be divided multiple times by one prime number associated with an item type to provide how many items of the item type are in the inventory. For example, first temporary result can be further divided by the same prime number 11 to determine how many of item type E 616 the inventory contains. Since the first temporary result 15,597,117 divides again evenly by 11 to yield a second temporary result 1,417,647, there are at least two items of the item type E 616 in the inventory. The second temporary result 1,417,647 can be again divided evenly by 11 to yield a third temporary result 128,877. Thus, there are at least three items of the item type E 616 in the inventory. However, since the third temporary result does not divide evenly again by 11 (yields 11,716.090909), the inventory contains three items of item type E 616. For such inventory checking, the division is not to be of permanent consequence, and may use a copy of the running product 628 for the inventory checking. In some embodiments, for a quick check of an existence of an item of a certain item type in the inventory, a modulo operation (e.g., % in C++ programming language) may be used. For example, if one wants to just check whether the inventory contains an item E 616 without a need to know how many of items of item type E 616 the inventory contains, one can perform 171,535,287% 11=0 to perform a quick check.

If an item of a certain item type is added to the inventory, then the running product 628 may be updated by multiplying the running product 628 with an unique prime number associated with the certain item type. For example, if an item J 626 is added to the inventory, the running product 628 updates to 171,535,287×29=4,974,523,323. If an item of a certain item type is removed from the inventory, then the running product 628 may be updated by dividing the running product 628 with an unique prime number associated with the certain item type. For example, if an item H 622 is removed, the updated running product 628 updates to 171,535,287÷19=15,594,117. In response to an addition or a removal of an item, the running product 628 can update non-temporarily (e.g., until later addition or removal of another item comes) to reflect an updated inventory.

In some embodiments, the catalogue of item types can be updated to include more or fewer item types. For example, in FIG. 6, in addition to the item types A, B, C, D, E, F, G, H, I, and J, an item type K may be added to the catalogue. The item type K may be associated with a unique prime number different from other unique prime numbers already associated with other item types. Then, for each stock of items of the item type K, the running product can be multiplied with the associated unique prime number associated with the item type K. If an item type is removed from the catalogue, the running product can be divided by one or more powers of an associated unique prime number corresponding to the item type. For example, in FIG. 6, if item type E is removed from the catalogue, then the running product can be divided by 11^3 and be updated to 128,877. The running product 128,877 may then be validated by determining that the running product is no longer evenly divisible by the unique prime number 11 associated with the item type E. In some embodiments, the unique prime number 11 may be released such that such that it can be reused by a different item type in a new association later.

Accordingly, the running product 628 can represent an entire inventory with a single integer. The running product method provides multiple advantages. There is no theoretical limit to the size of an inventory when a scalable big integer library is used. The inventory can be represented without rows, columns, or delimiters. Further, the running product method can significantly reduce data storage requirements. For example, when using a conventional delimiter-representation, a delimited list in this example is [B, D, E, E, E, G, H, H], which consumes 8 bytes if 1 byte represents a type (e.g., 2"8=256 types are to be represented). Another conventional approach represents an ordered list of counts of respective items with [0,1,0,1,3,0,1,2,0,0], which consumes 10 bytes if 1 byte represents a count of an associated item (e.g., 2"8=256 many items of each type can be represented). In contrast, the running product method can represent the entire inventory with a single integer 171,535,287, which takes up less than 4 bytes of storage, significantly less than the 8 bytes or 10 bytes associated with the conventional approaches. The running product method imposes no upper limits on either counts or types of items. Also, to determine if an item is in an inventory, the running product method does not require searching through the entire delimited list.

Figure 7:
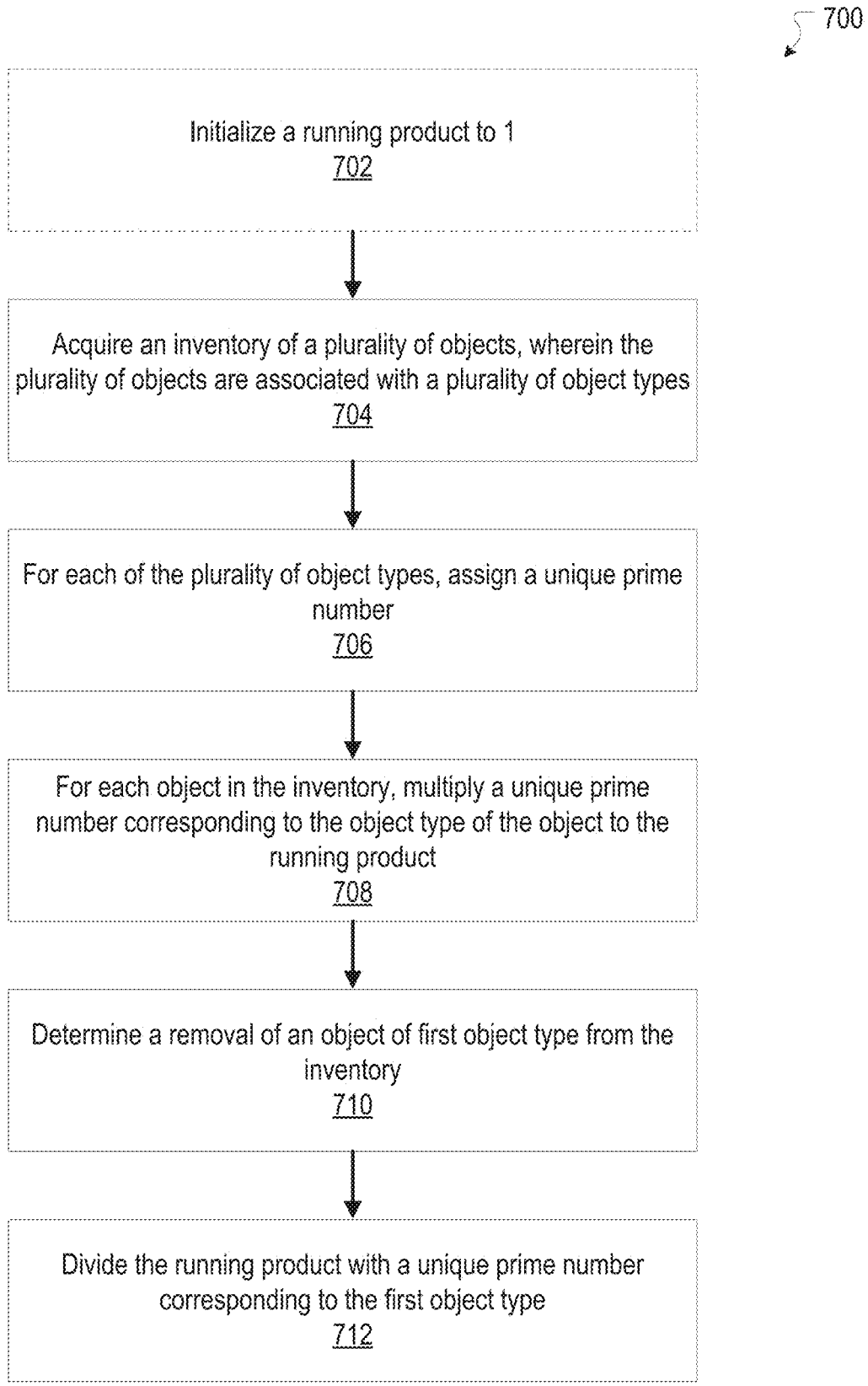
FIG. 7 illustrates a flowchart of an example method associated with representing an inventory of various types of objects with a multiplicative product, according to an embodiment of the present technology.

FIG. 7 illustrates a flowchart 700 of an example method associated with representing an inventory of various types of objects with a multiplicative product, according to an embodiment of the present technology. In some embodiments, It should be understood that there can be additional, fewer, or alternative steps performed in similar or alternative orders, or in parallel, based on the various features and embodiments discussed herein unless otherwise stated.

As shown in FIG. 7, at block 702, the example method 700 can optionally initialize a running product to 1. In some embodiments, for example where powers (e.g., exponentials) are used on prime numbers as described with respect to FIG. 6, the running product is automatically calculated to be 1 when there are no items in an inventory. At block 704, the example method 700 can acquire an inventory of a plurality of objects, wherein the plurality of objects are associated with a plurality of object types. At block 706, the example method 700 can, for each of the plurality of object types, assign a unique prime number. At block 708, the example method 700 can, for each object in the inventory, multiply a unique prime number corresponding to the object type of the object to the running product. At block 710, the example method 700 can determine a removal of an object of first object type from the inventory. At block 712, the example method 700 can divide the running product with a unique prime number corresponding to the first object type.

Hardware Implementation

Figure 8:
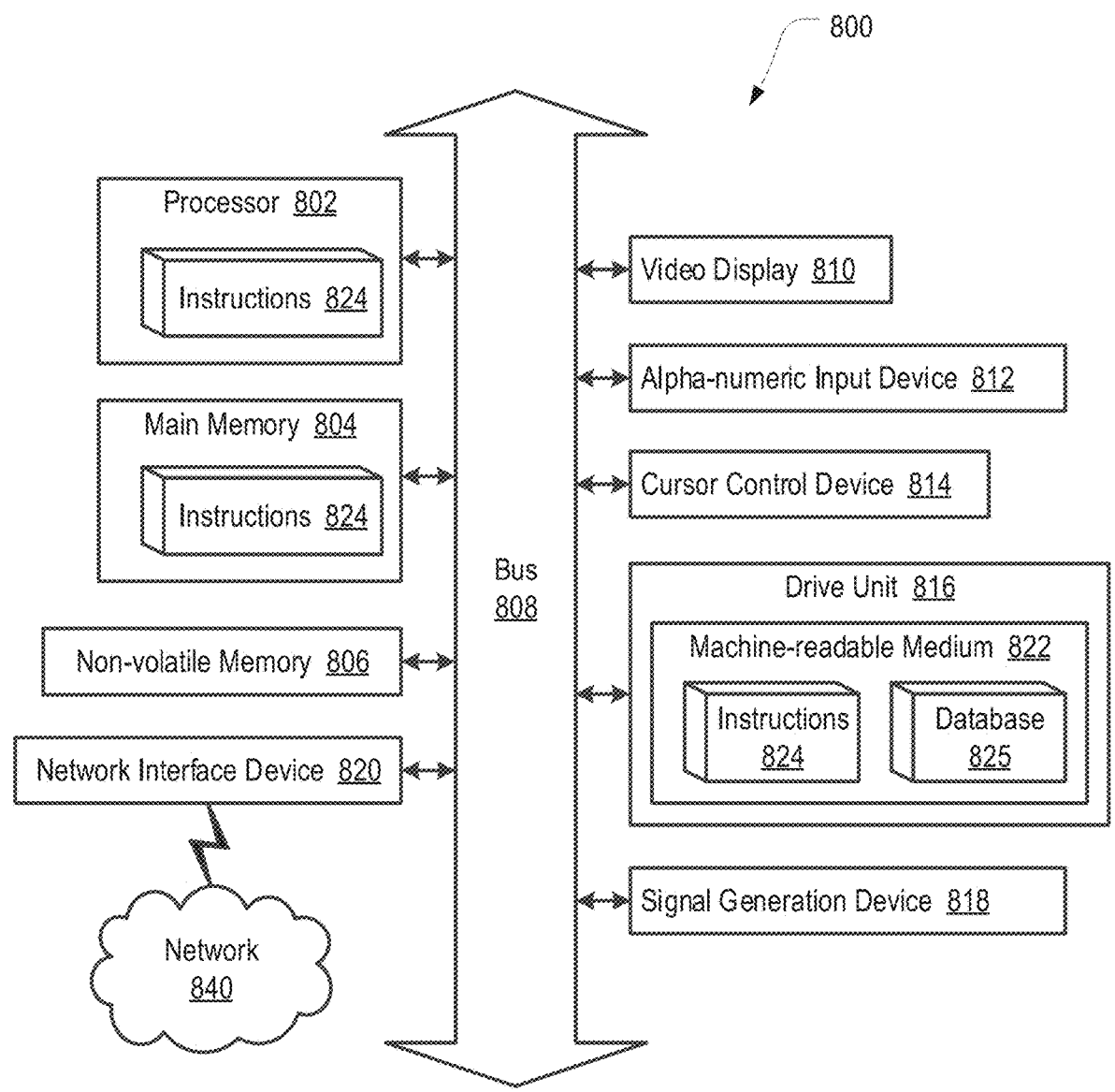
FIG. 8 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 8 illustrates an example of a computer system 800 that may be used to implement one or more of the embodiments described herein according to an embodiment of the invention. The computer system 800 includes sets of instructions 824 for causing the computer system 800 to perform the processes and features discussed herein. The computer system 800 may be connected (e.g., networked) to other machines and/or computer systems. In a networked deployment, the computer system 800 may operate in the capacity of a server or a client machine in a client-server network environment, or as a peer machine in a peer-to-peer (or distributed) network environment.

The computer system 800 includes a processor 802 (e.g., a central processing unit (CPU), a graphics processing unit (GPU), or both), a main memory 804, and a nonvolatile memory 806 (e.g., volatile RAM and non-volatile RAM, respectively), which communicate with each other via a bus 808. In some embodiments, the computer system 800 can be a desktop computer, a laptop computer, personal digital assistant (PDA), or mobile phone, for example. In one embodiment, the computer system 800 also includes a video display 810, an alphanumeric input device 812 (e.g., a keyboard), a cursor control device 814 (e.g., a mouse), a drive unit 816, a signal generation device 818 (e.g., a speaker) and a network interface device 820.

In one embodiment, the video display 810 includes a touch sensitive screen for user input. In one embodiment, the touch sensitive screen is used instead of a keyboard and mouse. The disk drive unit 816 includes a machine-readable medium 822 on which is stored one or more sets of instructions 824 (e.g., software) embodying any one or more of the methodologies or functions described herein. The instructions 824 can also reside, completely or at least partially, within the main memory 804 and/or within the processor 802 during execution thereof by the computer system 800. The instructions 824 can further be transmitted or received over a network 840 via the network interface device 820. In some embodiments, the machine-readable medium 822 also includes a database 825.

Volatile RAM may be implemented as dynamic RAM (DRAM), which requires power continually in order to refresh or maintain the data in the memory. Nonvolatile memory is typically a magnetic hard drive, a magnetic optical drive, an optical drive (e.g., a DVD RAM), or other type of memory system that maintains data even after power is removed from the system. The non-volatile memory 806 may also be a random access memory. The non-volatile memory 806 can be a local device coupled directly to the rest of the components in the computer system 800. A non-volatile memory that is remote from the system, such as a network storage device coupled to any of the computer systems described herein through a network interface such as a modem or Ethernet interface, can also be used.

While the machine-readable medium 822 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar nontransitory (or transitory), tangible (or non-tangible) storage medium; or any type of medium suitable for storing, encoding, or carrying a series of instructions for execution by the computer system 800 to perform any one or more of the processes and features described herein.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 800 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in diagram form in order to avoid obscuring the description or discussed herein. In other instances, functional diagrams and flow diagrams are shown to represent data and logic flows. The components of diagrams and flow diagrams (e.g., modules, engines, s, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," or the like means that a particular feature, design, structure, or characteristic described in connection with the embodiment is included in at least one embodiment of the disclosure. The appearances of, for example, the phrases "according to an embodiment", "in one embodiment", "in an embodiment", "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   associating, by a computing system, item types in a catalogue of item types with respective unique prime numbers, wherein each item type is associated with a corresponding unique prime number, wherein the catalogue is associated with an inventory of items, and wherein the inventory of items includes one or more items of the item types in the catalogue;
   representing, by the computing system, the inventory of items by a running product with a single integer, wherein the running product is a multiplicative product of the respective unique prime numbers with respective exponentials, and wherein the exponential of each of the unique prime numbers corresponds to a count of the items of the associated item types;
   determining, by the computing system, an availability of an item of an item type in the inventory of items when the running product representing the inventory of items is evenly divisible by a corresponding unique prime number associated with the item type; and
   determining, by the computing system, a count of the item of the item type in the inventory of items based on a number of results obtained after dividing the running product by the corresponding unique prime number associated with the item type, until the running product is not evenly divisible.

2. The computer-implemented method of claim 1, further comprising:
   receiving, by the computing system, a listing of a plurality of items, wherein the representing the inventory of items by the running product of the respective unique prime numbers further comprises:
     setting, by the computing system, the running product to 1; and
     for each item in the listing of the plurality of items:
       determining, by the computing system, the corresponding unique prime number associated with the item; and
       multiplying, by the computing system, the running product with the corresponding unique prime number.

3. The computer-implemented method of claim 1, further comprising:
   receiving, by the computing system, an indication that an item of an item type is added to the inventory of items; and
   multiplying, by the computing system, the running product with a corresponding unique prime number associated with the item type of the added item.

4. The computer-implemented method of claim 1, further comprising:
   receiving, by the computing system, an indication that an item of an item type is removed from the inventory of items; and
   dividing, by the computing system, the running product with a corresponding unique prime number associated with the item type of the removed item.

5. The computer-implemented method of claim 1, further comprising:
   determining, by the computing system, that the inventory of items does not contain the item of the item type when the running product representing the inventory of items is not evenly divisible by the corresponding unique prime number associated with the item type.

6. The computer-implemented method of claim 1, further comprising:
   receiving, by the computing system, an indication that an item type is added to the catalogue; and
   assigning, by the computing system, a unique prime number, different from the respective unique prime numbers, to the added item type.

7. The computer-implemented method of claim 1, further comprising:
   receiving, by the computing system, an indication that an item type is removed from the catalogue; and
   performing, by the computing system, a validation that the running product representing the inventory of items is not divisible by a corresponding unique prime number associated with the removed item type.

8. The computer-implemented method of claim 7, further comprising:
   releasing, by the computing system, the corresponding unique prime number associated with the removed item type such that the corresponding unique prime number can later be associated with a different item type.

9. A system comprising:
  at least one hardware processor; and
  a memory storing instructions that, when executed by the at least one hardware processor, cause the system to perform:
    associating item types in a catalogue of item types with respective unique prime numbers, wherein each item type is associated with a corresponding unique prime number, wherein the catalogue is associated with an inventory of items, and wherein the inventory of items includes one or more items of the item types in the catalogue;
    representing the inventory of items by a running product with a single integer, wherein the running product is a multiplicative product of the respective unique prime numbers with respective exponentials, and wherein the exponential of each of the unique prime numbers corresponds to a count of the items of the associated item types;
    determining an availability of an item of an item type in the inventory of items when the running product representing the inventory of items is evenly divisible by a corresponding unique prime number associated with the item type; and
    determining a count of the item of the item type in the inventory of items based on a number of results obtained after dividing the running product by the corresponding unique prime number associated with the item type, until the running product is not evenly divisible.

10. The system of claim 9, wherein the instructions further cause the system to perform:
  receiving a listing of a plurality of items,
  wherein the representing the inventory of items by the running product of the respective unique prime numbers further comprises:
    setting the running product to 1; and
    for each item in the listing of the plurality of items:
      determining the corresponding unique prime number associated with the item; and
      multiplying the running product with the corresponding unique prime number.

11. The system of claim 9, wherein the instructions further cause the system to perform:
  receiving an indication that an item of an item type is added to the inventory of items; and
  multiplying the running product with a corresponding unique prime number associated with the item type of the added item.

12. The system of claim 9, wherein the instructions further cause the system to perform:
  receiving an indication that an item of an item type is removed from the inventory of items; and
  dividing the running product with a corresponding unique prime number associated with the item type of the removed item.

13. The system of claim 9, wherein the instructions further cause the system to perform:
  determining that the inventory of items does not contain the item of the item type when the running product representing the inventory of items is not evenly divisible by the corresponding unique prime number associated with the item type.

14. The system of claim 9, wherein the instructions further cause the system to perform:
  receiving an indication that an item type is added to the catalogue; and
  assigning a unique prime number, different from the respective unique prime numbers, to the added item type.

15. A non-transitory computer readable medium including instructions that, when executed by at least one hardware processor of a computing system, cause the computing system to perform a method comprising:
  associating item types in a catalogue of item types with respective unique prime numbers, wherein each item type is associated with a corresponding unique prime number, wherein the catalogue is associated with an inventory of items, and wherein the inventory of items includes one or more items of the item types in the catalogue;
  representing the inventory of items by a running product with a single integer, wherein the running product is a multiplicative product of the respective unique prime numbers with respective exponentials, and wherein the exponential of each of the unique numbers corresponds to a count of the items of the associated item types;
  determining an availability of an item of an item type in the inventory of items when the running product representing the inventory of items is evenly divisible by a corresponding unique prime number associated with the item type; and
  determining a count of the item of the item type in the inventory of items based on a number of results obtained after dividing the running product by the corresponding unique prime number associated with the item type, until the running product is not evenly divisible.

16. The non-transitory computer readable medium of claim 15, wherein the instructions further cause the computing system to perform:
  receiving a listing of a plurality of items,
  wherein the representing the inventory of items by the running product of the respective unique prime numbers further comprises:
    setting the running product to 1; and
    for each item in the listing of the plurality of items:
      determining the corresponding unique prime number associated with the item; and
      multiplying the running product with the corresponding unique prime number.

17. The non-transitory computer readable medium of claim 15, wherein the instructions further cause the computing system to perform:
  receiving an indication that an item of an item type is added to the inventory of items; and
  multiplying the running product with a corresponding unique prime number associated with the item type of the added item.

18. The non-transitory computer readable medium of claim 15, wherein the instructions further cause the computing system to perform:
  receiving an indication that an item of an item type is removed from the inventory of items; and
  dividing the running product with a corresponding unique prime number associated with the item type of the removed item.

19. The non-transitory computer readable medium of claim 15, wherein the instructions further cause the computing system to perform:
  determining that the inventory of items does not contain the item of the item type when the running product representing the inventory of items is not evenly divisible by the corresponding unique prime number associated with the item type.

20. The non-transitory computer readable medium of claim 15, wherein the instructions further cause the computing system to perform:
   receiving an indication that an item type is added to the catalogue; and
   assigning a unique prime number, different from the respective unique prime numbers, to the added item type.

* * * * *